March 18, 1930.  E. W. ORTON ET AL  1,751,098
VALVE CONTROL SYSTEM
Filed July 11, 1927   2 Sheets-Sheet 1

INVENTORS:
Ernest W. Orton
Charles V. Foulds
BY White, Prost & Fryer
ATTORNEYS.

March 18, 1930. E. W. ORTON ET AL 1,751,098
VALVE CONTROL SYSTEM
Filed July 11, 1927   2 Sheets-Sheet 2

INVENTORS:
Ernest W. Orton
Charles V. Foulds
BY
White, Prost & Fryer
ATTORNEYS.

Patented Mar. 18, 1930

1,751,098

UNITED STATES PATENT OFFICE

ERNEST W. ORTON, OF MOUNTAIN VIEW, AND CHARLES V. FOULDS, OF BERKELEY, CALIFORNIA, ASSIGNORS TO THE PELTON WATER WHEEL COMPANY, OF SAN FRANCISCO, CALIFORNIA, A CORPORATION OF CALIFORNIA

VALVE-CONTROL SYSTEM

Application filed July 11, 1927. Serial No. 204,997.

This invention relates generally to systems for controlling hydraulic valves and has particular application to valve control systems for use in hydroelectric plants.

When valves are operated against a large head of water, as for example the penstock valves of hydroelectric systems, serious accidents may occur if the valve is opened at a time when the pressures on the inflow and outflow sides of the valve are not properly equalized. For this reason it has been customary to utilize a bypass about the valve whereby that section of pipe on the outflow side of the valve may be gradually filled with water until the pressure equalizes the pressure on the inflow side, after which the valve may be opened without danger. If the valve should be opened prematurely or without taking such precautions, the column of water on the inflow side initially acquires considerable velocity but is subsequently suddenly arrested when the pipe on the outflow side becomes filled. The acquired momentum of the water then causes a severe water hammer which may be sufficient to burst the pipe.

It is an object of this invention to devise a valve control system which will make it impossible for an operator to open the main valve until the outflow pipe section is properly filled with water.

It is a further object of this invention to utilize the pressure of the water upon the outflow side of a hydraulic valve in order to control valve actuating mechanism.

It is a further object of this invention to utilize the pressure upon the outflow side of a hydraulic valve for effecting opening of the valve and to utilize pressure upon the inflow side for effecting closing of the valve.

It is a further object of this invention to devise a simplified valve actuating mechanism which will embody certain inherent features of safety.

Further objects of this invention will appear from the following description in which we have set forth the preferred embodiment of our invention. It is to be understood that the appended claims are to be accorded a range of equivalents consistent with the state of the prior art.

Referring to the drawing.

Figure 1:
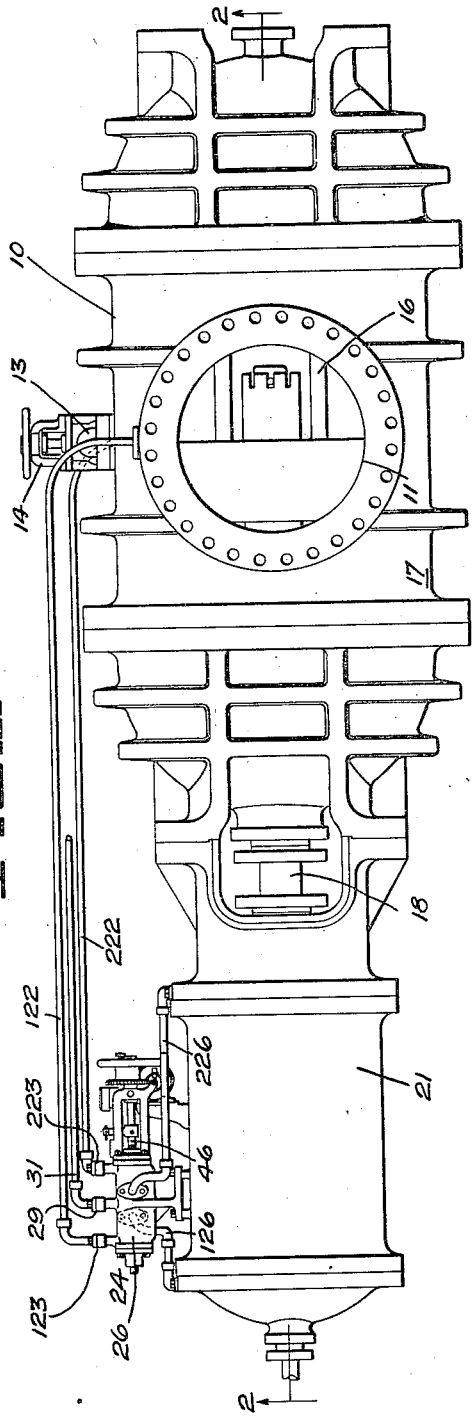
Figure 1 is an end elevational view illustrating the valve control system incorporating this invention.
Figure 2:
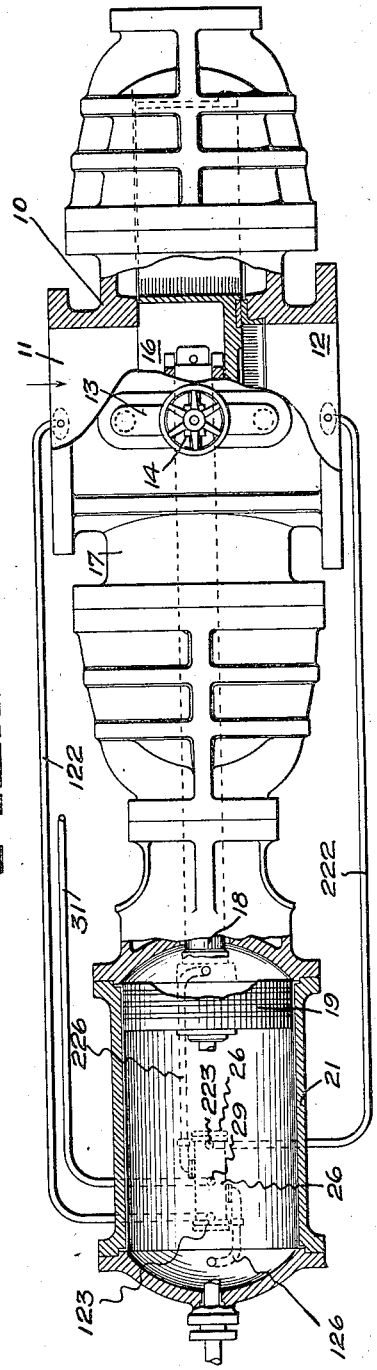
Fig. 2 is a side elevation view of the system shown in Fig. 1, certain parts being shown in cross section.

The invention may be outlined briefly as comprising mechanism, preferably of the hydraulic type, for opening and closing the valve which it is desired to control. Means is provided for preventing this mechanism from opening the valve until the operator has properly filled the pipe upon the outflow side by the use of the usual bypass. Thus a connection is made to the outflow side to provide a source of fluid pressure for effecting actuation of the mechanism to open the valve, and a similar connection is made to the inflow side for effecting closing of the valve under all conditions of operation. An auxiliary valve, serves as a convenient means by which the operator may control opening and closing of the valve. In practice this auxiliary valve preferably controls admission of fluid thru said connections to the hydraulic valve actuating mechanism.

In order to illustrate a specific embodiment of the invention we have shown a hydraulic valve 10 adapted for example to control flow of water thru the penstock pipe of a hydroelectric system. The inflow passage 11 of this valve is connected to the upstream section of the penstock pipe while the outflow passage 12 is connected to the downflow section. A bypass 13 communicates between the inflow and outflow sides of the valve 10, and is suitably controlled as by means of a valve 14. While a variety of hydraulic valves may be employed, in this particular instance we have shown a valve of the gate type in which the gate member 16 is slidably disposed within the valve housing 17. The gate member is adapted to be moved from open to closed position by means of a rod 18 which extends thru one side of the valve housing.

As has been previously mentioned, the mechanism for actuating the main valve is preferably of the hydraulic type and has been shown as comprising a hydraulic piston 19 connected to one end of valve rod 18, and operating within a hydraulic cylinder 21. For controlling movements of the piston 19, we preferably utilize two sources of hydraulic pressure, one being the inflow side of the main valve and the other being the outflow side. Thus there is shown a pipe 122 communicating with the inflow side of the valve 10 and another pipe 222 communicating with the outflow side. Flow of water thru these pipes to the hydraulic cylinder 21 is controlled by means of a suitable auxiliary valve control mechanism 24.

Figure 3:
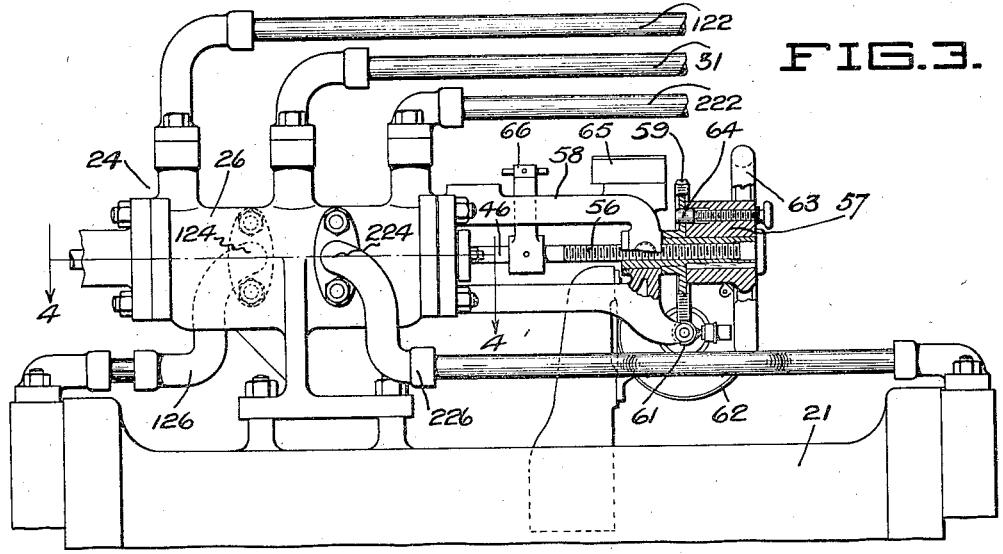
Fig. 3 is a detail ilustrating in side elevation the auxiliary control valve.
Figure 4:
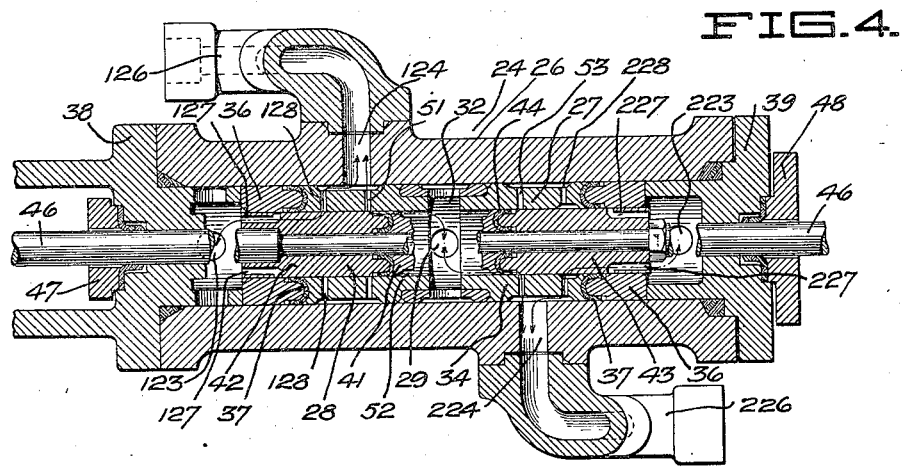
Fig. 4 is a cross sectional view taken along the line 4—4 of Fig. 3.

The control valve mechanism 24 is shown in detail in Figs. 3 and 4 and functions to selectively introduce water under pressure to either one of the two ends of the cylinder while exhausting water from the other cylinder end, whereby the piston 19 may be moved in either direction. Water from the outflow side of the valve by way of pipe 222 is introduced into the cylinder to move the piston in a direction to open the valve, while water from the inflow side by way of pipe 122 is introduced to move the piston to close the valve. It is obvious that we may employ any form of control valve which is capable of performing these functions, and it may be manually actuated, power operated, automatic, or may be semi-automatic in its operation. In its preferred form this valve includes a cylinder housing 26 having an inner longitudinal bore within which is disposed a sectional sleeve 27 forming a cylinder for a valve piston 28. One end of the cylinder is provided with a passageway 123 which is in communication with pipe 122, and the other end is provided with a like passageway 223 which is in communication with pipe 222. An intermediate portion of the cylinder is provided with a passageway 124 which is in communication with one end of the hydraulic cylinder 21 as by means of pipe 126. Another intermediate passageway 224 connects to the other end of hydraulic cylinder 21 by means of pipe 226. Passageway 29 in cylinder 26 connects with a suitable exhaust of discharge pipe 31.

While the construction of the sectional sleeve 27 is incident to the principal invention, it may be explained that this sleeve is formed of a central section 32, a pair of intermediate sections 33 and 34, and a pair of end sections 36. Suitable packing or cup washers 37 are provided between the end and intermediate sections, and all of the sections are securely clamped together in fixed relationship to the outer cylinder 26, by means of the cylinder ends 38 and 39. The sections of the plunger 28 preferably include a central section 41 and a pair of end sections 42 and 43.

Cup washers 44 are placed between these plunger sections, and they are securely clamped together and to a longitudinal plunger rod 46. The ends of plunger rod 46 preferably extend thru suitable packing clamps 47 and 48 in the cylinder ends 38 and 39.

In Fig. 4 of the drawing the plunger has been shown as approximately half-way between the limits of its movement. For controlling communication between passageways 123 and 124, the plunger section 41 is provided with ports 127 which are adapted to register with ports 128 in the sleeve section 28, when the plunger has moved to the right to the limit of its movement. When the plunger is moved to the left end of the cylinder as shown in Fig. 3, passageway 223 is likewise permitted to communicate with passageway 224 thru a similar set of ports 227 and 228. With the plunger in this latter position communication is established between passageway 124 and the exhaust passageway 29 thru ports 51 and the peripheral recess 52 provided upon the central plunger section 41. Likewise when the plunger is moved to its right hand limit, passageway 224 is caused to communicate with exhaust passageway 29 thru ports 53 and the recess 52. It is therefore obvious that this control valve 24 described above serves to exhaust the water from one end of the hydraulic cylinder 21 while establishing communication with the other end of the cylinder and either one or other of the pipes 122 and 222.

The plunger of the auxiliary control valve 24 may be operated manually or by motive means such as shown. A motor in this instance has been provided for moving the valve plunger in a direction to cause closing of the main gate valve, while for the sake of safety it is necessary for the operator to manually move the control valve plunger to a position to open the gate valve. Thus the plunger rod 46 has been shown as provided with a threaded portion 56 which is engaged by a rotatable nut 57. Nut 57 is journaled within a suitable bracket 58 which may be clamped to the cylinder 26. Loosely mounted with respect to the nut 57 there is a worm gear which is adapted to be driven by the worm 61 carried by the shaft of a suitable motor 62. The motor is preferably non-reversible so that it can only be driven in a direction to effect movement of the cylinder 19 to close the main valve. In order to move the plunger rod in the opposite direction, there is a hand wheel 63 mounted adjacent the worm gear 59 in fixed relationship to the nut 57, and this wheel is provided with a slidable clutch pin 64 which is normally adapted to engage an aperture in worm gear 59. In order to move the plunger rod 46 in a direction to open the main gate valve, the operator must first disengage the clutch pin 64 and then manually operate the hand wheel 63. However in moving plunger rod 46 to close the main valve, the clutch pin 64 may be engaged and plunger rod 46 moved under power of the motor 62.

In explaining the operation of the system described above, it will be assumed that the main valve is initially in closed position. Assuming that the pen-stock pipe section on the outflow side of the main valve is not filled with water and the operator attempts to move the plunger rod 46 in a direction to open the main valve, no pressure will be present in the pipe 222 with the result that it will be impossible to cause the hydraulic plunger 19 to move the main valve to open position. Therefore the operator must first open the bypass valve 14 and permit the pipe section on the outflow side to gradually fill with water until the outflow pressure tends to balance the pressure upon the inflow side. Then the hand wheel 63 is turned to move the control valve plunger toward the left as shown in Fig. 3, thus establishing communication between the passageway 223 and the pipe 226. Water then flows thru pipe 222 from the outflow side of the main valve to the lower or right hand end of the hydraulic cylinder 21 to cause movement of piston 19 in a direction to open valve 10. At the same time water from the other end of cylinder 21 is exhausted thru the exhaust pipe 31. When it is desired to close the main valve, instead of actuating the control valve manually, the motor 62 may be energized to move the control valve plunger to a position in which communication is established between passageways 123 and 124, thus introducing water under pressure from the inflow side of the main valve, thru pipe 122, and pipe 126 to the left hand end of hydraulic cylinder 21, thus causing piston 19 to move in a direction to close the valve gate 16. At the same time water from the right hand end of cylinder 21 is exhausted thru pipe 226 and the exhaust pipe 31.

If desired, provision may be made for automatically deenergizing motor 62 when rod 46 has been moved to its limit in a direction to open the main valve 10. For example there has been shown a limiting switch 65 which is included in series with the circuit for motor 62, and which is adapted to be tripped by a member 66 fixed to rod 46.

We claim:

1. In a hydraulic control system, a valve adapted to open and close a hydraulic pipe, the inflow side of the valve being connected to a source of water under pressure, a controllable bypass extending about said valve, hydraulic means utilizing the pressure of water on the outflow side of the valve for opening the same, and valve means for controlling flow of water from said outflow side to said hydraulic means.

2. In a hydraulic control system, a valve adapted to open and close a hydraulic pipe, the inflow side of the pipe being connected to a source of water under pressure, a controllable bypass communicating between the inflow and outflow sides of the valve, hydraulic motive means for opening or closing said valve, said motive means being connected to the inflow and outflow sides of the valve, and auxiliary valve means for controlling flow of water thru said connections to said motive means whereby the water from the outflow side is utilized to open the first named valve, and water from the inflow side is utilized to close the valve.

3. In a hydraulic control system, a valve for opening and closing a hydraulic pipe, the inflow side of the valve being connected with a source of water under pressure, a bypass extending about said valve, mechanism for opening said valve, means utilizing the pressure of water on the outflow side of the valve for effecting actuation of said mechanism to open the valve, and means for rendering said last named means active or inactive at the will of an operator.

4. In a hydraulic control system, a valve for opening and closing a hydraulic pipe, the inflow side of the valve being connected to a source of water under pressure, a controllable bypass extending about said valve, mechanism for opening and closing said valve, means utilizing the pressure of water on the outflow side of the valve for effecting actuation of said mechanism to open the valve, means utilizing the pressure of water on the inflow side of the valve for effecting closing of the valve, and means for rendering said last named means active or inactive at the will of an operator.

5. In a hydraulic control system, a valve adapted to open and close a hydraulic pipe, the inflow side of the valve being connected to a source of water under pressure, a controllable bypass extending about said valve, motive means responsive to pressure of water on the outflow side of the valve for opening the same and responsive to pressure on the inflow side of the valve for closing the same, and means for controlling said motive means, said means including a member movable to one position for rendering pressure on the inflow side effective to cause closing of the valve and to another position for rendering said pressure on the inflow side ineffective to cause closing of the valve.

6. In a hydraulic control system, a valve adapted to open and close a hydraulic pipe, the inflow side of the valve being connected to a source of water under pressure, a controllable bypass extending about said valve, motive means responsive to pressure of water on the outflow side of the valve for opening the same and responsive to pressure on the inflow side of the valve for closing the same, and means for controlling said motive means, said means including a member movable to one position for rendering pressure on the outflow side effective to cause opening of the valve and to another position for rendering said pressure on the outflow side ineffective to cause opening of the valve.

7. In a hydraulic control system, a valve adapted to open and close a hydraulic pipe, the inflow side of the valve being connected to a source of water under pressure, a controllable bypass extending about said valve, motive means responsive to pressure of water on the outflow side of the valve for opening the same and responsive to pressure on the inflow side of the valve for closing the same, and means for controlling said motive means, said means including a member movable to one position for rendering pressure on the outflow side of the valve effective to cause opening of the valve and to another position for rendering said pressure on the inflow side of the valve effective to cause closing of the valve.

8. In a hydraulic control system, a valve adapted to open and close a hydraulic pipe, the inflow of the valve being connected to a source of water under pressure, a controllable bypass extending about said valve, hydraulic means utilizing the pressure of water on the outflow side of the valve for opening the same, said means also utilizing pressure on the inflow side of the valve for closing the valve, and valve means for selectively controlling flow of water from said outflow and inflow sides to said hydraulic means.

In testimony whereof, we have hereunto set our hands.

ERNEST W. ORTON.
CHARLES V. FOULDS.